United States Patent [19]

Spafford et al.

[11] Patent Number: 5,173,186

[45] Date of Patent: Dec. 22, 1992

[54] FLUID FILTER CARTRIDGE AND HOUSING

[75] Inventors: Scott E. Spafford, Algonquin; Robert M. Holden, Addison, both of Ill.

[73] Assignee: Allied Filter Engineering, Inc., Bensenville, Ill.

[21] Appl. No.: 676,828

[22] Filed: Mar. 28, 1991

[51] Int. Cl.$^5$ ............................................. B01D 27/08
[52] U.S. Cl. ..................................... 210/455; 210/488; 210/497.01; 55/502
[58] Field of Search ............... 55/498, 502, 510, 521; 210/323.2, 340, 341, 455, 346, 347, 485, 486, 487, 488, 493.2, 493.1, 497.01

[56] References Cited

U.S. PATENT DOCUMENTS

| | | | |
|---|---|---|---|
| 2,612,270 | 9/1952 | Lewis, Jr. et al. | 210/131 |
| 2,701,062 | 2/1955 | Robinson | 210/148 |
| 2,770,426 | 11/1956 | Sievers | 242/123 |
| 2,886,180 | 5/1959 | Morgan et al. | 210/438 |
| 3,076,550 | 2/1963 | Wilhelm | 210/232 |
| 3,115,459 | 12/1963 | Giesse | 210/484 |
| 3,187,896 | 6/1965 | Wilkinson | 210/130 |
| 3,209,916 | 10/1965 | May et al. | 210/484 |
| 3,219,191 | 11/1965 | Suchy | 210/266 |
| 3,221,880 | 12/1965 | Wilkinson | 210/130 |
| 3,233,737 | 2/1966 | Hultgren | 210/434 |
| 3,262,572 | 7/1966 | Cook | 210/307 |
| 3,321,088 | 5/1967 | Williamitis | 210/489 |
| 3,326,382 | 6/1967 | Bozek et al. | 210/484 |
| 3,353,457 | 11/1967 | Whittingham et al. | 210/484 |
| 3,390,780 | 7/1968 | Bennett | 210/338 |
| 3,406,831 | 10/1968 | Bush et al. | 210/438 |
| 3,467,256 | 9/1965 | Humbert, Jr. et al. | 210/132 |
| 3,552,553 | 1/1971 | Reading | 210/484 |
| 3,662,893 | 5/1972 | Humbert, Jr. | 210/315 |
| 4,032,457 | 6/1977 | Matchett | 210/489 |
| 4,033,881 | 7/1977 | Pall | 210/491 |
| 4,253,954 | 3/1981 | Midkiff et al. | 210/168 |
| 4,632,682 | 12/1986 | Erdmannsdorfer | 55/498 |
| 4,636,311 | 1/1987 | Litzenburger | 210/323.2 |
| 4,878,930 | 11/1989 | Manniso et al. | 210/493.2 |
| 4,935,128 | 6/1990 | Hoeptner, III | 210/484 |
| 4,944,887 | 7/1990 | Frederick | 210/486 |
| 4,997,561 | 3/1991 | Schütz | 210/346 |
| 5,008,008 | 4/1991 | Lockshaw | 210/323.2 |

Primary Examiner—Robert A. Dawson
Assistant Examiner—W. L. Millard
Attorney, Agent, or Firm—Cook, Egan, McFarron & Manzo, Ltd.

[57] ABSTRACT

A coreless filter cartridge, and apparatus for adapting a filter housing to support such coreless filter cartridges. A coreless filter cartridge has an elongate array of filtering material which defines an interior cavity. The array is surrounded by a sheath of perforated paper. The ends of the array and sheath are embedded into polyurethane end-caps. The filter housing is adapted to accept coreless filter cartridges by adding a rigid, perforated standpipe that uses a bushing to fit over a housing fluid egress spud. The coreless filter cartridge is placed over the standpipe and secured in place by a retaining spider or by the housing cover, which exerts bias via a compression spring and compression cup. Gaskets on each end-cap prevent fluid by-pass and a stand-off cup is located near the base of the standpipe to provide a surface against which the end-cap gasket can seat.

13 Claims, 2 Drawing Sheets

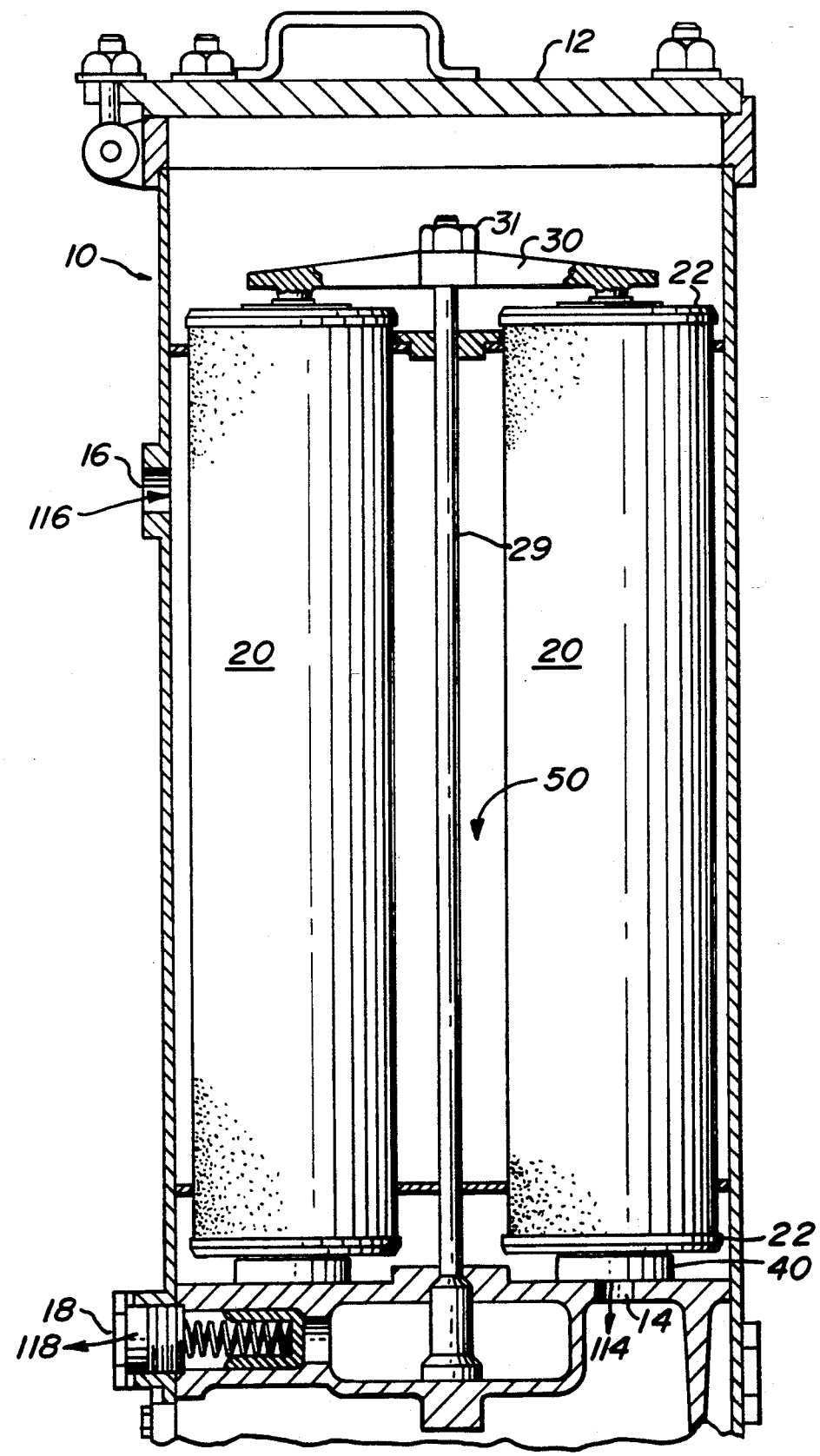

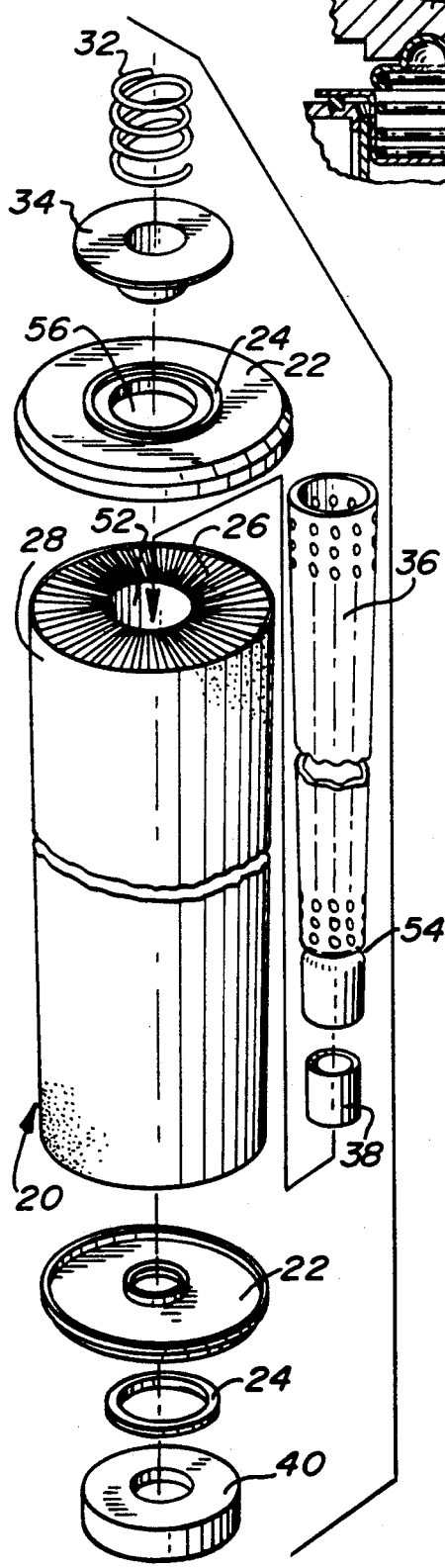
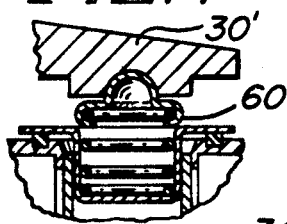
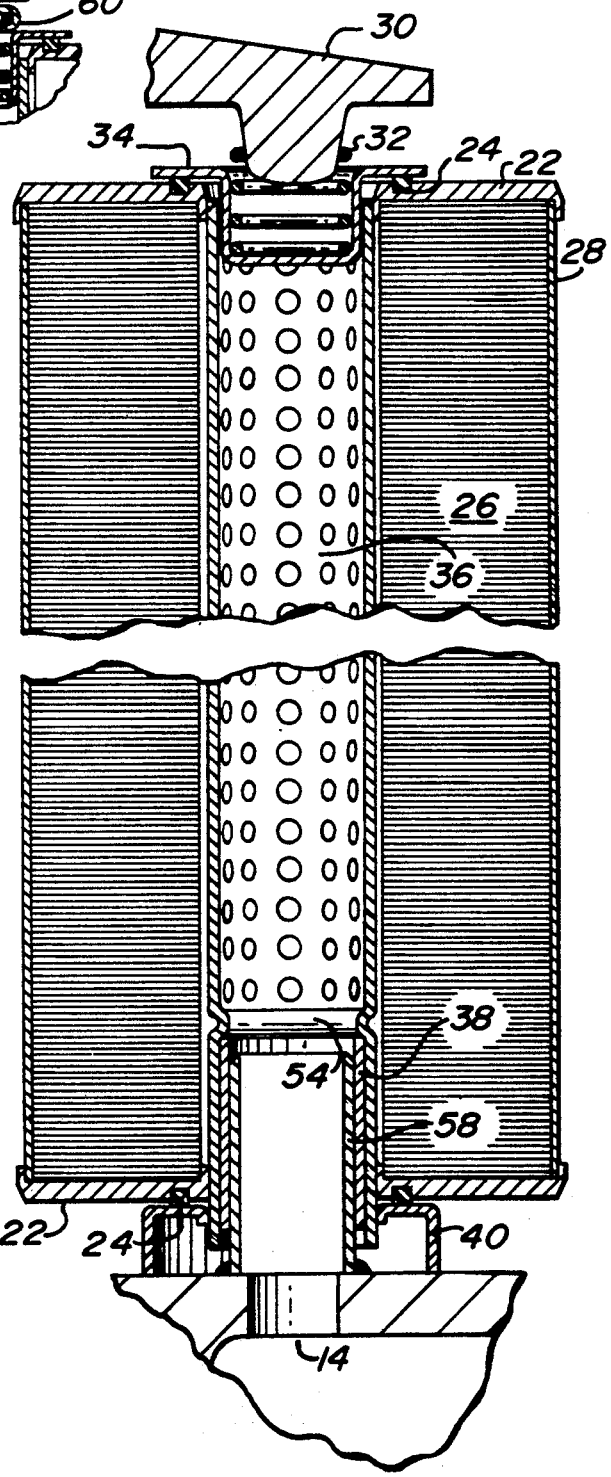

FLUID FILTER CARTRIDGE AND HOUSING

BACKGROUND OF THE INVENTION

The present invention relates generally to a fluid filtering system commonly used to filter oil or fuel in diesel locomotive engines and, more particularly, to a fluid filtering system having a unique filter cartridge and associated support structure.

A typical oil or fuel filtering apparatus used in diesel locomotive engines has a filter housing into which one or more disposable filter cartridges are placed. The filter housing has apertures for the ingress and egress of fluid flowing through the housing. In the usual situation, each egress aperture has a small nozzle or spud inside the filter housing over which a filter cartridge is placed. The filter cartridges are typically secured in place over the spuds by either a retaining spider inside the housing or by the cover of the housing itself.

The filter cartridges are used for a specified period of time; after which the oil is drained, the filter housing cover is removed, the retaining spider (if applicable) is loosened and the cartridges are removed and replaced with new cartridges.

Typical disposable filter cartridges in the prior art have had rigid, usually metal, center-tubes (disposable) surrounded by an array of filtering material, with metal end-caps, and often with a perforated metal or paperboard exterior sheath. The use of metal components provides the filter cartridges with sufficient strength to withstand the high fluid pressures often reached during use.

In operation, these filter cartridges are placed within the filter housing such that the rigid perforated center-tube of each filter is placed over the spud of a fluid egress aperture and the retaining spider or housing cover is fit over the opposite end of the filter cartridges to secure them in place. The typical path of fluid flow is into the filter housing chamber, through the outside walls of the filter cartridges, through the filtering material, into their perforated center-tubes, and finally out of the filter housing through the fluid egress apertures. (Although this is a typical path of fluid flow, it could be reversed so that fluid flows from inside the filter cartridge out into the filter chamber.)

In the past, used filter cartridges were disposed of in any convenient manner. However, current and future environmental regulations will rigidly control how cartridges may be disposed. Spent cartridges are typically drained of oil and then either sent to an appropriate landfill as is or crushed to extract additional oil before going to the landfill. However, landfill space is becoming increasingly scarce—and expensive. Consequently, there is a desire to have a filter cartridge from which residual oil may be more thoroughly extracted and which may be disposed of by being incinerated.

While filter cartridges using metal parts function adequately for their intended purpose, problems have arisen with disposal of the used cartridges. The use of metal parts makes it difficult to compact the used filter cartridges in order to extract oil. Additionally the metal pieces (end-caps, center-tube, and, if applicable the exterior sheath) cannot be incinerated, thus making that method of disposal less effective.

Accordingly, it is a principal object of the present invention to provide a fluid filter cartridge which can be easily and effectively compacted for disposal.

A related object is to provide a fluid filter cartridge which can be completely incinerated.

It is another object of the present invention to provide an apparatus for conveniently adapting a fluid filter housing to accept coreless filter cartridges.

These objects, as well as others that will become apparent upon reference to the accompanying drawings and following detailed description, are provided by a coreless fluid filter cartridge made of non-metal parts, and apparatus for adapting a filter housing to support such coreless filter cartridges. A coreless filter cartridge has an elongate array of filtering material which defines an interior cavity. The array is surrounded by a sheath of perforated paper. Both ends of the array and sheath are embedded into polyurethane end-caps. The filter is secured in the filter housing by means of a rigid, perforated standpipe that has a bushing to fit over a fluid egress spud. The coreless filter cartridge is placed over the rigid standpipe and secured in place by the retaining spider or housing cover. A compression spring and compression cup are interposed between the coreless filter cartridge and retaining spider arm or housing cover to facilitate engagement. Gaskets on each end-cap prevent fluid by-pass and a stand-off cup is located near the base of the standpipe to provide a surface against which the end-cap gasket can seat.

BRIEF DESCRIPTION OF THE DRAWINGS

In describing the preferred embodiment, reference is made to the accompanying drawings wherein:

FIG. 1 shows a fluid filter housing containing two filter cartridges according to the present invention;

FIG. 2 shows an exploded view of a coreless filter cartridge and support structure according to the present invention;

FIG. 3 shows a longitudinal cross-section of the present invention as installed; and FIG. 4 is a fragmentary cross-section showing an alternate structure for securing the filter cartridge within the housing.

DESCRIPTION OF A PREFERRED EMBODIMENT

Turning to the figures of the drawings, there is seen in FIG. 1 a fluid filter housing containing two filter cartridges according to the present invention. It will be understood that while FIG. 1 shows a two cartridges, the typical filter housing accommodates a plurality of filter cartridges.

Referring to FIG. 1, two filter cartridges 20 are contained within the fluid filter housing, generally indicated by 10. The housing has a removable cover 12 which allows access to the interior for removing and replacing spent filter cartridges. The housing has apertures for the ingress 16 and egress 14 of fluid. Oil to be filtered enters the filter housing through a main fluid port 16, as indicated by the arrow 116, and is directed to the exteriors of the filter cartridges.

During operation, fluid flows in through port 16, into the filter cartridge housing chamber, then around and into filter cartridges 20. The fluid is filtered as it passes through the filtering material of the cartridges. Filtered fluid then passes in through the walls of the perforated stand pipe (best seen in FIG. 3) and out through the fluid egress apertures, as indicated by arrow 114 in FIG. 1. Finally, the filtered fluid leaves the filter housing through egress port 18, as indicated by the arrow 118.

Illustratively, the retaining spider 30 holds the filter cartridges in place. It should be noted, however, that the method of retaining the cartridges in place varies between manufacturers and can be accomplished using a spider, a plate, the housing cover, or any other means for applying a securing bias.

To replace one or more filter cartridges, housing cover 12 is removed, then (if applicable) retaining spider 30 is disengaged, and the filter cartridge is removed and a new one put in.

In keeping with one aspect of the invention, a novel filter cartridge 20 is provided. As best seen in FIG. 2, the coreless filter cartridge 20 is made of pleated filter material 26, surrounded by a perforated paper sheath 28, and with an elongate interior cavity 52. Unlike prior filter cartridges, the filter cartridge 20 does not utilize a rigid core integral with the inner surface of the filter material 26 facing the interior cavity 52.

The filter material is made of non-woven natural fibers, non-woven synthetic fibers, woven synthetic materials and mixtures thereof. The filter material 26 and outer sheath 28 are embedded into end-caps 22, as best seen in FIG. 3. According to the preferred embodiment, end-caps 22 are made of polyurethane. Using molded polyurethane end-caps improves pleat end-sealing and provides for visual verification that pleated media is totally sealed and that fluid by-pass cannot occur during use. Moreover, using polyurethane for the end-caps improves pleat retention because polyurethane has a higher shear strength than vinyl plastisol and is not subject to under and over curing during the manufacturing process. Also, polyurethane has a higher temperature resistance and has a greater resistance to solubility in petroleum based or synthetic fluids than vinyl plastisol. A gasket 24 made of rubber, cork, or other suitable material as is known in the art, is press-fit in a groove on each end-cap, as best seen in FIG. 3.

In accordance with the present invention, and as best seen separately in FIG. 2, a rigid, perforated standpipe 36 has a bushing 38 which fits within the base of the rigid standpipe. Bushing 38 is prevented from travelling too far into standpipe 36 by an annular crimp 54. As best seen in FIG. 3, bushing 38 and standpipe 36 are installed over a fluid egress spud 58. Bushing 38 can be made of brass, nylon, teflon, plastic or other suitable material as will be apparent to one skilled in the art. Since rigid standpipe 36 is relatively permanent it can be made of heavier gauge metal than the disposable center-tubes typical of prior art filter cartridges. This has the advantage of increasing the cartridge collapse strength and permits the use of the coreless filter cartridge 20 described above. The use of the standpipe 36 also reduces the risk of introducing metallic particles—due to manufacturing processes used in making prior art cartridges—into effluent fluid at every filter cartridge change. Similarly, the risk of corrosion or oxidation is reduced, which can occur in lighter gauge disposable center-tubes manufactured with non-plated metal, or with tubes that are manufactured of plated metal, but are then subjected to forming processes which can remove the protective plating at the edges of perforations, lock-seams, spot welds, and edges. Preferably standpipe 36 has rounded edges at its tip to prevent damage to filter cartridges as they are being slid over the standpipe.

Returning to FIG. 2, there is seen a stand-off cup 40 which is force-fitted near the base of standpipe 36 and provides a surface against which gasket 24 can seat, (as best seen in FIG. 3).

FIG. 2 also shows a compression cup 34 and compression spring 32. As best seen in FIG. 3, compression cup 34 slips partially into the tip of standpipe 36. One end of compression spring 32 fits into compression cup 34 while the other end engages a protrusion from an arm of retaining spider 30. Retaining spider 30 is tightened down by means of a nut 31 and threaded rod 29 (see FIG. 1) to exert a bias on compression spring 32. Compression spring 32 conducts the bias to compression cup 34 and the brim or flange of compression cup 34 seats against the second gasket 24. In this manner the coreless filter cartridge 20 is retained in position over rigid standpipe 36. The gaskets 24 seal the ends of the filter cartridge preventing pressurized fluid from by-passing the filter cartridge without passing through the filtering material. Moreover, compression spring 32 will provide a relatively constant bias even if there are small changes in cartridge height caused by a swelling or shrinking of the cartridge 20 and its components during operation.

FIG. 4 shows an adapter nipple 60 which is used with an alternate style of retaining spider 30' or housing cover (not shown). Adapter nipple 60 has a tip which fits into and engages an indentation of retaining spider 30'. The body of adapter nipple 60 has dips which fit around and engage compression spring 32.

After forming, the metal pieces—standpipe 36, compression spring 32, compression cup 34, and standoff cup 40—are preferably plated with cadmium. It should be noted, however, that these pieces can be made of other suitable materials, such as plastics, which will be apparent to one skilled in the art.

From the foregoing, it can be seen that a fluid filter apparatus has been provided that fully meets the objects of the instant invention. The present invention also reduces raw material and forming costs associated with metallic parts, as well as reducing labor operations necessary to produce filter cartridges. Furthermore, the weight of filter cartridges is reduced and therefore shipping costs. While the apparatus has been described in terms of a preferred embodiment, there is no intent to limit the invention to the same. On the contrary, it is intended to cover all modifications and equivalents with the scope of the appended claims. It will be appreciated by one skilled in the art that many variations and modifications can be made within the scope and spirit of the present invention.

One modification which can be made is the elimination of a separate compression cup 34. Instead, an equivalent structure could be formed as an integral part of one of the end-caps.

What is claimed is:

1. A locomotive engine fluid filter assembly comprising a filter housing, fluid conducting apertures for allowing ingress and egress of fluid to be filtered, an elongate fluid filter cartridge having an interior cavity, and biasing means for securing said filter cartridge within said housing;

an elongate rigid, hollow, perforated standpipe having first and second ends and sized to fit within the interior cavity of said fluid filter cartridge, said standpipe being independent of said filter cartridge and connected at its first end to a fluid conducting aperture of the fluid filter housing and its second end to said biasing means;

a bushing adapted to overfit a projection at the fluid conducting aperture and sized to fit interior of the standpipe to facilitate attachment and communication of said rigid standpipe with the fluid conducting aperture; and a stop structure interior of the standpipe to restrict travel of said bushing.

2. The fluid filter assembly of claim 1, wherein said biasing means for securing said filter cartridges within said housing comprises a fluid filter cartridge retaining spider having an arm corresponding to each filter cartridge, each arm adapted to secure one end of the filter cartridge within the housing.

3. The fluid filter assembly of claim 2, further comprising:

a compression cup having a predetermined exterior diameter, an interior depression, and a brim, said exterior cup diameter being sized to fit within the second end of the rigid standpipe, said interior depression being adapted to receive a protrusion from the retaining spider, and said compression cup brim being adapted to sealingly engage the coreless filter cartridge and prevent the compression cup from traveling beyond the desired depth into the rigid standpipe.

4. The fluid filter assembly of claim 3, further including:

a compression spring interposed between, said compression cup and retaining spider or housing cover to engage said compression cup so as to maintain a constant bias against the filter cartridge to hold the filter cartridge in place as the filter cartridge height expands or contracts in response to the change in temperature of the fluid being filtered.

5. The fluid filter assembly of claim 3, wherein said compression cup is molded as an integral part of the filter cartridge end-cap.

6. The fluid filter assembly of claim 1, wherein said bushing is made of material selected from the group comprising plastic, nylon, teflon, and brass.

7. The fluid filter assembly of claim 1, wherein said rigid standpipe is rounded at its second end so as to avoid damage to the filter cartridge during placement over the standpipe.

8. The fluid filter assembly of claim 1, further comprising:

a stand-off cup adapted to cooperate with the first end of said rigid standpipe so as to provide a sealing surface against which the filter cartridge may be sealingly positioned.

9. The filter assembly of claim 1, wherein said assembly includes a plurality of filter cartridges.

10. A fluid filter assembly comprising:

a filter housing including a base, walls, top, and fluid conducting apertures for the ingress and egress of fluid to be filtered;

a perforated rigid standpipe having an attaching end and a free end, said attaching end removably secured to the filter housing and communicating with a fluid conducting aperture;

a disposable coreless fluid filter cartridge independent of said rigid standpipe having an array of filtering material, said array having an elongate interior cavity which is adapted to receive a rigid standpipe, and having an exterior of approximately cylindrical shape with first and second ends and first and second end-caps with sealing gaskets embedded therein;

a stand-off cup fixedly fastened to said rigid standpipe near its attached end so as to provide a sealing surface against which said first end-cap sealing gasket is positioned; and retaining means for securely biasing said filter cartridge disposed over said rigid standpipe.

11. The filter assembly of claim 10, wherein:

said rigid standpipe communicates with a fluid conducting aperture for the egress of fluid out of the assembly;

said rigid standpipe has a rounded free end to avoid damage to the coreless fluid filter cartridge during installation, and includes a bushing to aid in fitting the standpipe to the fluid conducting aperture; and said retaining means includes a compression cup which is adapted to receive a protrusion from said retaining spider and is also adapted to fit within the free end of the rigid standpipe and has a brim to sealingly engage the second fluid filter end-cap gasket.

12. The filter assembly of claim 11, further comprising:

a compression spring interposed between, and engaging, said retaining spider and compression cup; and a nipple with a first end adapted to engage said retaining spider and a second end adapted to engage said compression spring to facilitate positioning of the cartridge retaining means.

13. An apparatus for adapting a fluid filter housing of an internal combustion locomotive engine to accept a coreless filter cartridge, said housing including fluid conducting apertures for the ingress and egress of fluid, comprising:

a rigid, perforated standpipe including first and second ends and sized to fit within said housing, said first end including a bushing to communicatively connect to one of said fluid conducting apertures, and said second end sized to received a coreless filter cartridge; and a stand-off cup disposed near said first end of said standpipe to provide a sealing surface against which a filter cartridge may be sealingly positioned.

* * * * *